UNITED STATES PATENT OFFICE.

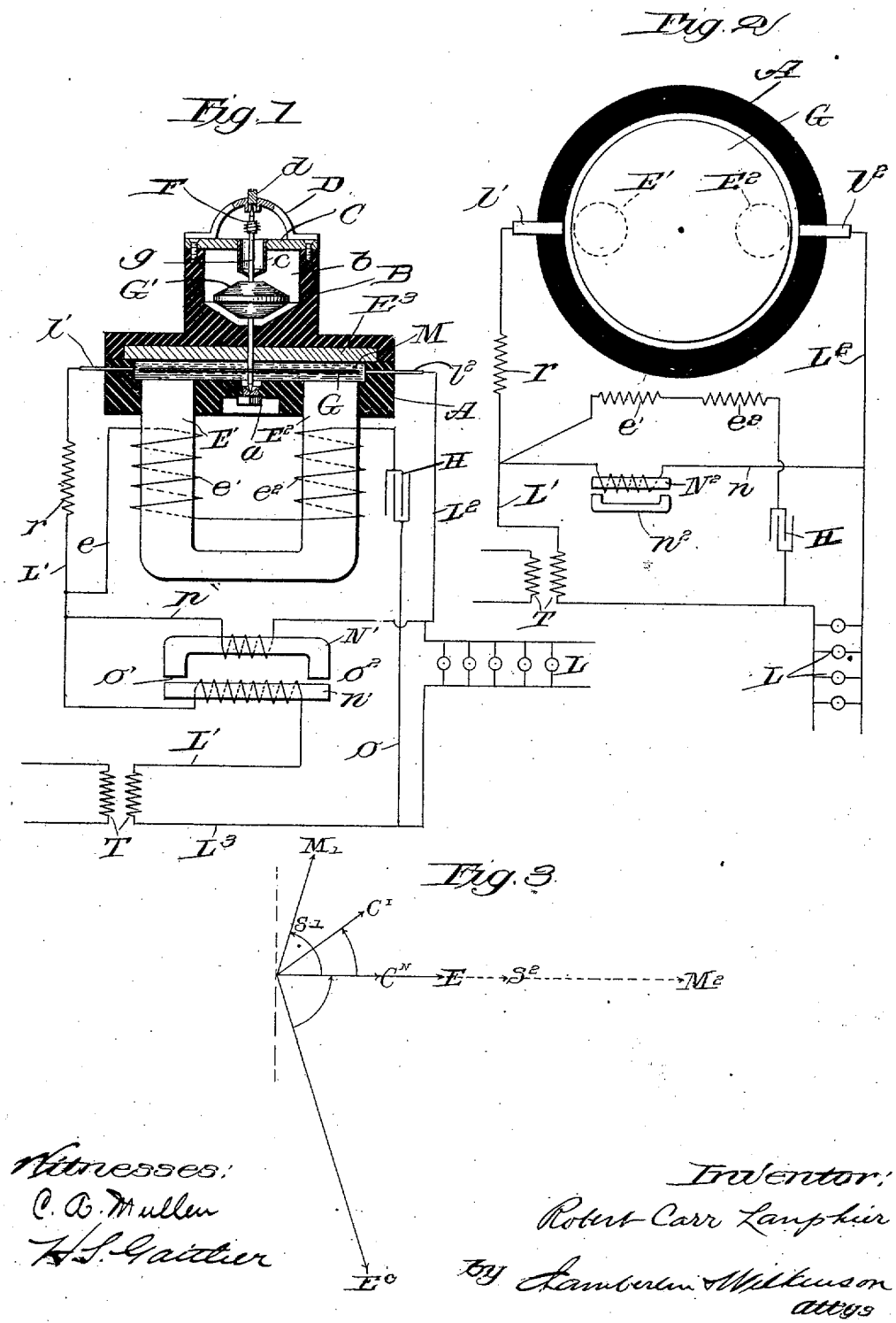

ROBERT C. LANPHIER, OF SPRINGFIELD, ILLINOIS.

ALTERNATING-CURRENT METER.

No. 870,970.    Specification of Letters Patent.    Patented Nov. 12, 1907.

Application filed September 8, 1904. Serial No. 223,693.

*To all whom it may concern:*

Be it known that ROBERT CARR LANPHIER, whose post-office address is %  Sangamo Electric Co., Springfield, Illinois, a citizen of the United States, residing at Springfield, county of Sangamon, State of Illinois, has invented a certain new and useful Improvement in Alternating-Current Meters; and declare the following to be a full, clear, and exact description of the same, such as will enable others skilled in the art to which it pertains to make and use the same, reference being had to the accompanying drawings, which form a part of this specification.

My invention relates in general to meters for measuring electric currents, and more particularly to meters for measuring alternating currents.

It has heretofore been common to employ motor wattmeters of the well-known mercury type for measuring direct currents, but so far as I am aware no successful attempt has been made prior to my invention to employ such type of meter for measuring alternating currents. This type of meter, as is well known in the art, consists of a rotatable conductor for the load current immersed in mercury and located in inductive relation to a magnetic field, the reaction of which upon the current rotates the conductor of the load current. An embodiment of this type of meter is covered by United States Patent No. 738,902, granted to Guttman and myself September 15, 1903, which consists of a copper disk immersed in a body of mercury and exposed to a strong magnetic field, the arrangement being such that the main current traverses the disk diametrically while a shunt current passes through the energizing pressure coils of the magnetic field thereby rotating the disk.

The principal difficulty encountered in using a meter of the type referred to for measuring alternating currents is that the current in the shunt coils, due to their great self induction, will lag so much that the field produced by such coils will have a difference of phase from the impressed E. M. F. of 70 degrees or more. This difference of phase results in the meter having almost no torque when the load is non-inductive and in having on inductive load a torque which will greatly increase as the power factor of the load decreases and the main load current thereby comes more nearly in phase with the lagging magnetic field.

Another difficulty which arises, when the first difficulty above mentioned has been overcome, in the use of a meter of the type referred to for alternating currents is that the speed of rotation of the disk does not increase proportionately with the increase in load. When a meter of this type is used for measuring direct currents there is quite a large error on full load, the meter running from 20 to 25% slow if no compensation is provided. The error when the meter is used for alternating currents is, however, more than twice as great as for direct currents, being nearly 70% difference between the speed on one ampere and the speed on ten amperes when no compensation is provided.

The primary object of my invention is to provide a mercury motor watt-meter for measuring alternating currents which will be free from the objections above enumerated.

A further object of my invention is to provide a mercury motor watt-meter of the type above mentioned for alternating currents in which an electro-motive force will be impressed on the shunt coils so as to bring the magnetic field produced by them in phase with the line pressure, that is to say, with the load current on non-inductive load, which will render the meter capable of measuring an inductive or non-inductive load with equal accuracy.

A further object of my invention is to provide a mercury motor watt-meter of the type described for measuring alternating currents in which a portion of the main current will be shunted around the rotary conductor, more of the current being proportionately shunted on light load than on full load, whereby the speed of rotation of the disk will be reduced on light load and gradually increased as the load increases in proportion to the normal tendency of the disk to lag behind in its speed of rotation as the load increases.

A still further object of my invention is to provide a motor watt-meter for alternating currents which will be simple in construction, inexpensive in manufacture, and efficient in use.

The embodiment of my invention herein disclosed, generally described, consists in a rotary disk for conducting the main current immersed in mercury and located in a magnetic field the coils of which are in shunt across the line, a condenser in series with the coils of the field, a return path above the disk for the magnetic lines preferably composed of laminated metal, and an inductive shunt around the disk.

My invention will be more fully described hereinafter with reference to accompanying drawings in which the same is illustrated as embodied in a convenient and practical form and in which,—

Figure 1 is principally diagrammatic, but in which parts are shown in vertical section; Fig. 2 a view showing the mercury cup and disk in plan and the coöperating parts diametrically; and Fig. 3 a vector diagram.

Similar reference characters are used to designate similar parts in the several figures of the drawing.

Reference letter A indicates a mercury cup formed of any suitable insulating material. B designates a cover for the mercury cup, also made of insulating material, which is provided with a chamber $b$. C designates a cap for closing the top of chamber $b$.

A disk G of good conducting material, such as copper, is immersed in the mercury M in the cup A. $g$ designates a vertical spindle extending concentrically through the disk G and to which the latter is affixed.

The lower end of the spindle $g$ is tapered and rests upon a conical bearing $a$, the latter being conveniently made in the form of a screw which is inserted in an opening through the bottom of the mercury cup. The portion of the spindle which extends upwardly through the chamber $b$ has fixed thereon a counterweight $G'$ while the upper end of the spindle is tapered and engages a conical bearing $d$, the latter being preferably formed as a screw supported by a yoke D mounted upon the cap C. A thimble F depends from the cap C and concentrically surrounds the spindle $g$ thereby preventing the escape from the chamber $b$ of any mercury which may flow thereinto from the mercury cup when the latter occupies any other position than a vertical one.

$E'$ and $E^2$ indicate the poles of a magnet which extend through the bottom wall of the mercury cup A. $E^3$ designates the return path for the magnetic lines, which is preferably formed of laminated metal and is supported within the cover B diametrically across the disk G.

$l'$ and $l^2$ indicate conductor terminals which extend through the mercury cup in the same horizontal plane as the disk G and at diametrically opposite points.

$L'$ designates one line of the power circuit which is connected to the terminal $l'$ while $L^2$ designates a continuation of the line extending from the terminal $l^2$ and connecting with any suitable translating apparatus such as indicated at L.

$L^3$ indicates the return line extending from the translating apparatus L. The lines $L'$ and $L^3$ are connected in any suitable manner either from a dynamo or from a transformer such as indicated at T.

$e$ indicates a shunt circuit leading from the line $L'$ to the line $L^3$ and comprising the energizing coils $e'$ and $e^2$ which surround the cores $E'$ and $E^2$ of the magnet. Located in series with the coils $e'$ and $e^2$ and interposed between the same and the line $L^3$ is a condenser H.

A shunt circuit $n$ which includes an inductive resistance extends from the line $L'$ to line $L^2$. The inductive resistance indicated in Fig. 1 consists in a core $N'$, the winding of which is in the shunt circuit $n$, and a core $n'$ the energizing coil around which is connected in the main line $L'$. The core $N'$ may preferably be formed of laminated metal and the poles thereof are spaced apart from the core $n'$ so as to form small air gaps $o'$ and $o^2$.

In Fig. 2 the inductive resistance in the shunt circuit $n$ is shown as consisting in a choke coil, the poles of the core $N^2$ of which are located adjacent to the ends of a yoke $n^2$.

$r$ indicates a non-inductive resistance in the main line between the shunt $n$ and the terminal $l'$ to cause a portion of the current to pass through the shunt around the disk G until the inductive resistance in the shunt increases sufficiently to cause practically all of the current to pass through the disk.

F designates a worm on the spindle $g'$ by means of which the rotary motion of the disk G is communicated to any suitable registering mechanism.

The operation of my invention is as follows: The alternating current passes from the dynamo or transformer T through the line $L'$, non-inductive resistance $r$, terminal $l'$, disk G, terminal $l^2$, line $L^2$, to the translating apparatus L, thence through the return line $L^3$ to the dynamo or transformer. A portion of the current proportional to the line voltage also passes through the shunt circuit $e$, windings $e'$ and $e^2$ of the magnetic field, condenser H to the return line $L^3$. The reaction of the magnetic field upon the disk G rotates the latter and the rotation thereof is recorded upon suitable registering apparatus operatively connected to the worm F in any usual or well-known manner. The condenser H impresses an electro-motive force on the coils $e'$ and $e^2$ thereby bringing the magnetic field produced by them in phase with the line pressure on non-inductive load. The lagging of the current in the coils $e'$ and $e^2$ due to their self-induction is thereby overcome so that the difference in phase between the impressed E. M. F. and the magnetic field is eliminated. By properly adjusting the self-induction and capacity of the system any desired phase of the magnetism in the shunt field may be obtained and such adjustment may be conveniently accomplished by using fixed coils and a variable condenser, so that the meter may be readily adjusted to measure correctly either a non-inductive or an inductive load to the lowest possible factor.

The condenser not only impresses upon the shunt coils an E. M. F. in advance of the line pressure, but also increases the potential across the coils of the magnetic field so that the strength of the field is much greater than that obtained by connecting them directly across the original line without the employment of a condenser. It has been found in practice that with a 100 volt 60 cycle circuit the condenser raises the pressure at least three or four times.

The operation above described is graphically illustrated in the vector diagram in Fig. 3, in which E indicates the impressed line pressure; $C^n$ the main current on non-inductive load; $C'$ the main current on inductive load; $S'$ the shunt current through the coils $e'$ and $e^2$, lagging 80 degrees when the shunt is connected across the circuit; $M'$ the magnetic field of the shunt, the phase of which is that of the shunt current $S'$; $E^c$ the pressure impressed on the shunt coils $e'$ and $e^2$ when the condenser is used, the phase being 80 degrees in advance of and greater than that of the line pressure E; $S^2$ the current in the shunt coils due to $E^c$, the pressure impressed by the condenser; and $M^2$ the magnetism which is in phase with the line pressure E owing to the pressure impressed on the coils by the condenser.

As previously stated, the rotation of the disk G does not increase proportionally as the load increases. This error is partially eliminated by the employment of the laminated metal return plate $E^3$ for the magnetic lines owing to there being less eddy currents than when the return plate is made of soft steel or cast iron. The remaining error is corrected by the inductive resistance located in shunt with the disk G which serves to shunt more of the current when the load is light and gradually increases in reactance as the load increases thereby sending a greater proportion of the current through the disk and consequently increasing its speed of rotation. The reactive resistance through the inductive shunt should increase as the load increases in proportion to the normal tendency of the speed of the disk to relatively fall behind the increase in load. The inductive resistance is preferably such as indicated in Fig. 1 in which all of the load current passes through the primary energizing turns around the core $n'$ so that on light load the primary coil has very little effect on the inductive shunt through the lead $n$, but on full load the primary coil has a very great effect on the inductive resistance in the shunt by introducing into the coil of the resistance a counter E. M. F. sufficient to cause practically infinite resistance through the shunt so that nearly all of the current passes through the disk thereby resulting in maximum rotative torque at full load, whereas on light load the effect of the primary winding is so slight upon the inductive shunt that only about one-half of the total current at that load passes through the disk G.

It is obviously a simple matter to so adjust the relative primary and secondary coils in the shunting device just described as to compensate for the normal tendency of the disk to relatively fall behind in its speed of rotation as the load increases. The non-inductive resistance $r$ serves to insure the passing of a portion of the current across the shunt $n$ on light load.

The presence of the air gaps $o'$ and $o^2$ in the magnetic circuit of the shunting device is of importance inasmuch as in a closed magnetic circuit the effect of the shunting device will not increase properly with the increasing load, as on very light load the magnetism will be lower in proportion for the magnetizing force than on heavier loads. This is due to the fact that the magnetism of soft iron initially increases very slowly with the magnetizing force and consequently by introducing an air gap in the magnetic circuit of the shunting device enough primary turns can be employed to initially magnetize the coil sufficiently for the lightest loads which the meter must measure, and the magnetization will then increase up to the highest load which the meter is adapted to measure.

In lieu of the inductive resistance above described, which is preferably employed, I may use an inductive resistance such as indicated in Fig. 2, consisting in a choke coil in the shunt $n$ and the yoke $n^2$ which owing to the presence of the non-inductive resistance $r$ carries approximately half of the current around the disk on light load, but as the load increases the reactance increases, thereby sending through the disk a greater proportion of the main current as the load increases.

From the foregoing description it will be observed that I have invented an improved meter for alternating currents consisting of a mercury motor meter, such as heretofore used for direct currents, in connection with means for compensating for the lagging of the magnetic field due to the self-induction of the shunt coils thereof, and in connection with compensating means for overcoming the tendency of the rotary conductor disk to fall behind in speed and not increase proportionally to the increase in load.

While I have described my invention as applied to a motor meter for alternating currents in which mercury is the conducting medium for electrically uniting the line to a rotary conductor, yet it is to be understood that my invention may also be applied to motor meters for alternating currents in which other conducting mediums or means than mercury may be employed for electrically connecting the rotary conductor to the line, and while I have described more or less precisely the details of construction, I do not wish to be understood as limiting myself thereto, as I contemplate changes in form, in proportion of parts, and the substitution of equivalents as circumstances may suggest or render expedient, without departing from the spirit of my invention.

Having now fully described my invention, what I claim as new and desire to secure by Letters Patent is:

1. In a mercury motor watt meter for alternating currents, the combination with a rotary conductor through which the main current passes to translating apparatus, of a body of mercury in which said conductor is immersed, a magnet in the field of which said conductor is located, a coil for energizing said magnet located in shunt relatively to said conductor, and means for counteracting the self-induction of said coil and thereby bringing the magnetic field in phase with the line pressure.

2. In a mercury motor watt meter for alternating currents, the combination with a rotary conductor through which the main current passes to translating apparatus, of a body of mercury in which said conductor is immersed, a magnet in the field of which said conductor is located, a coil for energizing said magnet located in a shunt across the line, and means for impressing an electro-motive force on said coil so as to bring the magnetic field in phase with the line pressure.

3. In a mercury motor watt meter for alternating currents, the combination with a rotary conductor through which the main current passes to translating apparatus, of a body of mercury in which said conductor is immersed, a magnet in the field of which said conductor is located, a coil for energizing said magnet located in a shunt across the line, and a condenser in series with said coil.

4. In a mercury motor watt meter for alternating currents, the combination with a rotary conductor through which the main current passes to translating apparatus, of a magnet in the field of which said conductor is located, a coil for energizing said magnet located in a shunt across the line, a body of mercury in which said conductor is immersed, and means for counteracting the self-induction of said coil and so as to bring the magnetic field in phase with the line pressure.

5. In a mercury motor meter for alternating currents, the combination with a rotary conductor through which the main current passes to translating apparatus, of a body of mercury in which said conductor is immersed, a magnet in the field of which said conductor is located, a coil for energizing said magnet, a condenser in series with said coil, both said coil and said condenser being located in a shunt across the line, and means operating as the load increases to increase the current passing through said conductor at a greater rate than the load increases.

6. In a mercury motor meter for alternating currents, the combination with a rotary conductor through which the main current passes to a translating device, of a body of mercury in which said conductor is immersed, a magnet in the field of which said conductor is located, a coil for energizing said magnet, a condenser in series with said coil, both said coil and condenser being located in a shunt across the line, and means for shunting around said rotary conductor a portion of the current, such portion gradually decreasing as the load increases.

7. In a mercury motor meter for alternating currents, the combination with a rotary conductor through which the main current passes to a translating device of a body of mercury in which said conductor is immersed, a magnet in the field of which said conductor is located, a coil for energizing said magnet located in a shunt across the line, means for counteracting the self-induction of said coil and thereby bringing the magnetic field in phase with the line pressure, and an inductive shunt around said rotary conductor.

8. In a mercury motor meter for alternating currents, the combination with a rotary conductor through which the main current passes to a translating device, of a body of mercury in which said conductor is immersed, a magnet in the field of which said conductor is located, a coil for energizing said magnet located in a shunt across the line, means for counteracting the self-induction of said coil and thereby bringing the magnetic field in phase with the line pressure, and a transformer having its secondary coil in shunt with said rotary conductor and its primary coil in the main line.

9. In a mercury motor meter for alternating current, the combination with a rotary conductor through which the main current passes to a translating device, of a body of mercury in which said conductor is immersed, a magnet in the field of which said conductor is located, a coil for energizing said magnet located in a shunt across the line, a condenser in series with said coil and means operating as the load increases to increase the current passing through said conductor at a greater rate of increase than that of the load.

10. In a mercury motor meter for alternating currents, the combination with a rotary conductor through which the main current passes to a translating device, of a body of mercury in which said conductor is immersed, a magnet in the field of which said disk is located, a coil for energizing said magnet located in a shunt across the line, a condenser in series with said coil, and an inductive shunt around said rotary conductor.

11. In a mercury motor meter for alternating currents, the combination with a rotary conductor through which the main current passes to translating apparatus, of a body of mercury in which said conductor is immersed, a magnet in the field of which said conductor is located, a coil for energizing said magnet located in a shunt across the line, and means operating as the load increases to increase the driving torque upon said conductor at a greater rate than the current increases.

In testimony whereof, I sign this specification in the presence of two witnesses.

ROBERT C. LANPHIER.

Witnesses:
J. W. ARMBRUSTER,
M. F. O'BRIEN.